UNITED STATES PATENT OFFICE.

MARI E. WOLVEKAMP, OF OAKLAND, CALIFORNIA.

ALKALI SALTS OF OXIDIZED PROTALBINIC ACID AND OF OXIDIZED LYSALBINIC ACID AS STABLE PROTECTIVE COLLOIDS FOR MERCURY COMPOUNDS.

1,391,154.    Specification of Letters Patent.    Patented Sept. 20, 1921.

No Drawing.    Application filed March 27, 1920. Serial No. 369,204.

*To all whom it may concern:*

Be it known that I, MARI E. WOLVEKAMP, a subject of the Queen of the Netherlands, and a resident of Oakland, in the county of Alameda and State of California, have invented certain new and useful chemical compounds, consisting in the alkali salts of oxidized protalbinic acid and of oxidized lysalbinic acid as stable protective colloids for mercury compounds, of which the following is a specification.

My invention relates to the alkali salts of oxidized protalbinic acid and of oxidized lysalbinic acid, obtained out of an albumin, for example, egg albumin or serum albumin, and their use as stable protective colloids for mercury compounds for medical purposes, and consists substantially in the manufacture and processes for obtaining these products herein described and claimed.

The foremost object of the invention is to provide pure colloidal mercury compounds in the dry state, of which the solutions may be boiled without precipitation of free mercury.

Colloidal solutions of mercuric oxid, mercuric sulfid or mercuric salicylate can be made with the aid of the alkali salts of protalbinic acid or of lysalbinic acid, but these solutions are very unstable, even at a low temperature, and therefore cannot be obtained in a pure form in the dry state.

Out of an alkaline colloidal solution obtained from 100 grams protalbinic acid and 75 grams mercuric chlorid, 34 grams mercury will be separated after ten hours heating at 100° C. The now already low rate of mercury precipitation diminishes more and more until after forty hours practically no more mercury precipitates.

In order to free this solution of the mercuric salt or colloidal mercury compound still present, warming with glucose was found to be a convenient method.

The protalbinic acid has now been oxidized and its alkali salt is a protective colloid, stable in combination especially with mercury compounds.

For the oxidized protalbinic acid and the oxidized lysalbinic acid, I propose the names protoxalbinic acid and lysoxalbinic acid, and for their mixture simply oxalbinic acid.

The oxidation makes the acids and alkali salts darker and more reddish colored. The first precipitated acids are strongest colored. The oxidized acids settle with more difficulty than protalbinic acid. An important difference between lysalbinic acid and its oxidation product is that lysalbinic acid is not precipitated by acidification of the salt solution, whereas oxidized lysalbinic acid is insoluble and therefore precipitated. This makes dialysis quite unnecessary. The acids are also insoluble in alcohol.

The dry sodium salts containing more than 25% colloidal mercuric oxid, mercuric sulfid or mercuric salicylate are soluble in about two parts of water and therefore compare in solubility favorably with mercuric chlorid or the more poisonous mercuric oxycyanid. Furthermore, they do not precipitate at all white of an egg solution, are neutral and do not attack nickel or silver.

A solution of colloidal mercuric salicylate, even when sodium chlorid is present, gives the black mercuric sulfid reaction only after standing awhile with the ammonium sulfid solution. The protalbinic and lysalbinic acid are obtained according to Paal's method (see *Ber. d. D. Chem. Gesellsch*, 35, p. 2206).

The so-called caseo-protalbinic acid and caseo-lysalbinic acid seem to be totally decomposed by the oxidation under the same circumstances.

*Mixture of the sodium salts of oxidized protalbinic acid and of oxidized lysalbinic acid.*

A mixture of 100 grams dry serum albumin, 15 grams sodium hydroxid and 500 grams water, is heated one hour at 100° C. filtered or better decanted from a 10% solution and concentrated. Add 10 grams sodium hydroxid and 60 grams freshly precipitated mercuric oxid, bring and keep it at 1000 grams and heat forty hours at 100° C. Decant from mercury, add 20 grams glucose and heat eight hours at 100° C. Decant from mercury, precipitate with acid, wash well and dissolve with as little as possible 2N. sodium hydroxid solution and filter. The solution should be still acid to phenolphthalein.

Evaporate at 100° C. to dryness. Yield 33 grams, containing 13.2% ash.

*Sodium salt of oxidized protalbinic acid.*

1000 grams solution, containing 100 grams dry protalbinic acid—obtained by acidifying the solution of the hydrolyzed serum albumin and filtering,—40 grams sodium hydroxid and 80 grams mercuric oxid, is heated forty hours at 100° C. Decant, add a little excess of hydrochloric acid and filter. By dissolving with just enough 2N. sodium hydroxid solution to keep it still acid to phenolphthalein and evaporating to dryness at 100° C., there is obtained a yield of 60 grams, containing 12.8% ash and 6.7% mercury, as compound in colloidal combination.

*Sodium salt of oxidized lysalbinic acid.*

The acid solution, containing the lysalbinic acid—out of 100 grams blood serum albumin—is made alkalin and 48 grams mercuric oxid are added. The solution is brought up to 1000 grams and heated forty hours at 100° C. Decant, add excess of hydrochloric acid, filter, wash, dissolve with as little as possible 2N. sodium hydroxid and evaporate at 100° C. to dryness. Yield 20 grams, containing 11.2% ash and 6% mercury as compound in colloidal combination.

In the following examples is figured per 100 grams of the sodium salt of oxidized protalbinic acid, 2/10 gram molecule of mercuric oxid or mercuric sulfid or mercuric salicylate, taking into account the mercury compound already present.

*Colloidal mercuric oxid.*

To a solution of 100 grams of the sodium salt of oxidized protalbinic acid, containing 12.8% ash and 6.7% mercury, there is added 45.3 grams mercuric chlorid in solution and a solution containing 13.3 grams sodium hydroxid. Evaporate to dryness at 100° C. Yield 154.2. Contains 27.7% mercuric oxid.

*Colloidal mercuric sulfid.*

Instead of the 13.3 grams sodium hydroxid, there is added a solution containing 15.6 grams sodium sulfid and evaporate to dryness at 100° C. Yield 160.3 grams. Contains 29.0% mercuric sulfid.

*Colloidal mercuric salicylate.*

Instead of the 13.3 grams sodium hydroxid, there is added 56.1 grams mercuric salicylate and 4.6 grams salicylic acid and some ammonia. Evaporate to dryness at 100° C. Yield 156.2 grams. Contains 42.1% mercuric salicylate.

A non-dissociated mercuric salicylate may still easier be obtained by pouring in a solution of the sodium salt of mercuric salicylate and afterward neutralizing with hydrochloric acid.

I claim:

1. The alkali salts of oxidized protalbinic acid and of oxidized lysalbinic acid in combination with a mercury compound.

2. The alkali salts of oxidized protalbinic acid and of oxidized lysalbinic acid in combination with mercuric salicylate.

MARI E. WOLVEKAMP.